United States Patent [19]

Dalton

[11] 4,149,226
[45] Apr. 10, 1979

[54] LIGHT FIXTURE

[75] Inventor: John Dalton, Yardley, Pa.

[73] Assignee: Keystone Lighting Corp., Bristol, Pa.

[21] Appl. No.: 817,904

[22] Filed: Jul. 22, 1977

[51] Int. Cl.² ............................................. F21S 5/00
[52] U.S. Cl. .................................... 362/216; 362/260; 362/306
[58] Field of Search ............... 362/216, 227, 260, 404, 362/406, 306

[56] References Cited

U.S. PATENT DOCUMENTS

| | | | |
|---|---|---|---|
| 2,538,681 | 1/1951 | Gangbin | 362/216 |
| 2,943,238 | 6/1960 | Reaves | 362/216 |
| 3,742,208 | 6/1973 | Mills | 362/216 |

Primary Examiner—Samuel W. Engle
Assistant Examiner—Donald P. Walsh
Attorney, Agent, or Firm—Edelson and Udell

[57] ABSTRACT

A lighting fixture of square, rectangular or triangular shape consisting of a completely enclosed metal box within which the wiring and ballast transformers are contained, with integral portions of the box providing supports for one or more fluorescent lamps and thereby completely eliminating the need to secure to the body of the fixture separate support clips for the lamps. Reductions in material and manufacturing costs as well as shipping costs are realized because of reductions in material used, assembly time and physical size. The closed box configuration permits open suspension mounting, and the geometry is such that heat to which the ballasts are subjected is reduced.

15 Claims, 9 Drawing Figures

LIGHT FIXTURE

This invention relates generally to lighting fixtures, and more particularly relates to fluorescent lighting fixtures of the type utilizing circular lamps. The lighting fixture according to the invention, as compared to prior known types, is smaller, less expensive, electrically safer, provides extended ballast life, and is adaptable for open suspension mounting if desired.

In the past, circular fluorescent tube light fixtures have utilized metal clips to hold the lamps in position with respect to the fixture, the clips being separate pieces of metal secured to the main body of the light fixture. In general, these clips have been made of flat strips of metal with a curved portion fitting to the contour of the fluorescent lamp and having an extension on one end which is fastened to the fixture shell by riveting or by some other appropriate means of securement. The curved portion of the clip is generally in the form of an arc of substantially 90° extending half above and half below the horizontal plane of the fluorescent tube ring, these clips usually engaging the inside diameter of the circular lamp. In some designs, three such clips are used for each lamp spaced 120° apart, while in other designs the function of one of such clips is provided by a curved socket to which the lamp is electrically as well as mechanically connected. Additionally, these prior art designs of circular fluorescent tube lighting fixtures have usually been of circular or disk-like shape and required forming by means of drawing or spinning operations with attendant poor utilization of fixture blank material.

The lighting fixture according to the present invention differs from the prior art structures in several ways which provide the various advantages of the construction according to the invention. The embodiments of the invention as illustrated in the drawings are of square, rectangular or triangular shape and consist of a completely enclosed metal box within which the wiring and ballast are contained, with integral portions of the box itself providing the support for one or more fluorescent lamps and thereby completely eliminating the need to secure separate support clips to the body of the fixture. This effects a material cost reduction since the cost of the clips is eliminated as well as the labor required to secure the clips to the housing. Moreover, the housing itself is less costly to manufacture because it can be stamped instead of requiring a drawing or spinning operation, thereby using simpler tooling and obtaining a higher percentage utilization of the blank material.

In all forms of the invention, the fixture is so formed that the standard 32 watt circular fluorescent lamp extends radially outwardly beyond substantially all parts of the fixture itself, excepting for those points of support provided by certain parts of the housing. Accordingly, the size of the fixture is physically small resulting in reduction in shipping costs because of substantially higher density packaging. The fixture is electrically safer than present fixtures because the wiring compartment is completely enclosed in metal, and this feature also renders the fixture adaptable for open suspension by means of a stem or chain if desired.

Because of the physically small size of the fixture which results in the physical positioning of a 32 watt fluorescent lamp radially outwardly beyond the sidewalls of the fixture, the heat generated by this lamp is not transmitted to the inside of the housing where the ballasts are located, thereby resulting in extended ballast life and the elimination of class P nuisance outstages, Class P ballasts are ballasts which have a thermal cut-out built in so that rises ballast temperature beyond a certain point cause the ballast to be electrically open-circuited and thereby cause the lights to be extinguished. When thereafter the ballast temperature falls, the lights will come on again. A subsequent temperature rise will again cause the lights to be extinguished, and this on and off cycling becomes a source of great annoyance to the user. In some cases this problem has been sufficiently severe that it has required the use of non-class P ballasts which are not acceptable to Underwriters Laboratories. Since Underwriters Laboratories listing of a fixture is an important consideration in many cases where fluorescent lighting fixtures are to be specified for installation, a non-listed fixture is not acceptable in such cases. The construction of the lighting fixture according to the invention eliminates the trapped heat problem so that class P ballasts can be used and the fixture is therefore Underwriters Laboratories listed.

A primary object of the invention is to provide a novel fluorescent tube lighting fixture in which the lamp retainers are formed integrally with the fixture housing and are not a plurality of individual pieces requiring separate manufacture and assembly.

Another object of the invention is to provide a novel light fixture as aforesaid which is physically small in size and thereby less expensive to manufacture and to ship.

A further object of the invention is to provide a novel fluorescent light fixture as aforesaid in which the electrical wiring and ballast are completely enclosed in a metal housing which is substantially entirely positioned within the inside diameter of a circular fluorescent lamp to thereby reduce the lamp heat to which the ballast is subjected.

The foregoing and other objects of the invention will become clear from a reading of the following specification in conjunction with an examination of the appended drawings, wherein.

In these several figures, like elements are denoted by like reference characters.

Figure 1:
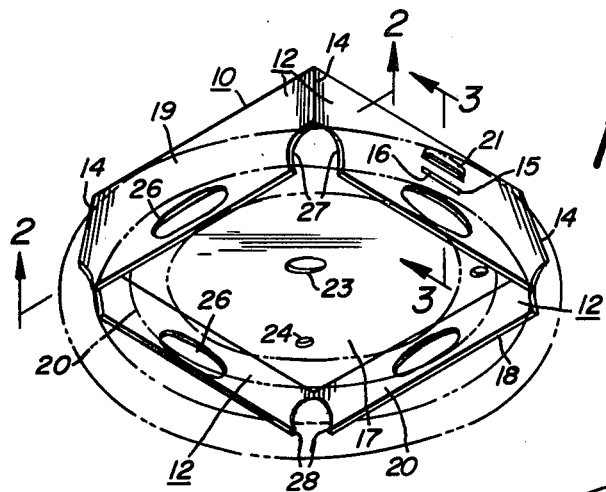
FIG. 1 is a perspective view from below of one form of light fixture according to the invention illustrating a pair of different diameter fluorescent circular lamps installed on the fixture.
Figure 2:
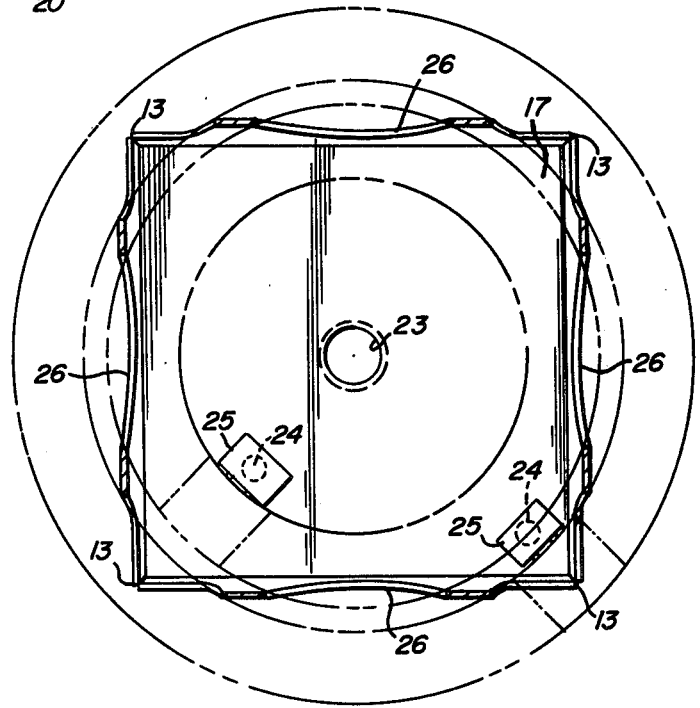
FIG. 2 is a horizontal sectional view through the fixture as shown in FIG. 1 as would be seen when viewed along the line 2—2 of FIG. 1.
Figure 3:
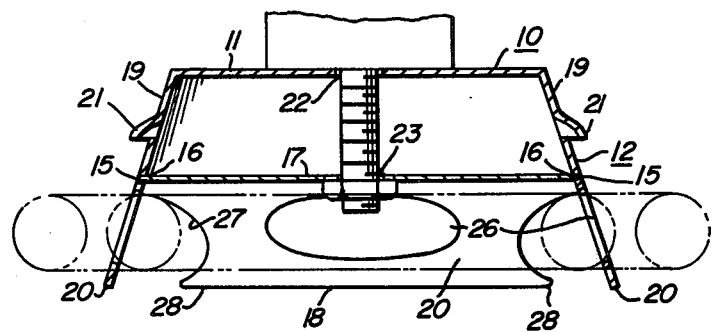
FIG. 3 is a vertical sectional view through the light fixture shown in FIG. 1 as would be seen when viewed along the line 3—3 of FIG. 1.

Considering first the embodiment of the invention shown in FIGS. 1 to 3, there is seen a square housing designated generally as 10 having a top or back pan 11 from each of the four side edges of which extend a downwardly projecting sidewall 12, the sidewall 12 having opposite ends 13 which abut the ends of the adjacent sidewalls to form corners 14, so that an inverted pan or tray is formed. One pair of the opposite sidewalls 12 are provided with a rectangular slot 15 into which project tabs 16 which latter extend from a pair of opposite side edges of a square plate 17. As best seen in FIG. 3, the sidewalls 12 diverge slightly from one another in the direction extending away from the back pan 11, and the plate 17 fits closely within the four sidewalls 12 in a plane parallel to the back pan 11 and substantially halfway between the back pan 11 and the lower edges 18 of the sidewalls 12. Each sidewall 12 has an upper section 19 which extends horizontally between the corners 14, and a lower skirt section 20. The sidewalls upper sections 19 together with the back pan 11 and plate 17 form a closed box within which the fixture wiring and the electrical ballast are disposed in a completed fixture. Two of the sidewalls upper sections 19 are provided with heat relieving louvers 21. The back pan 11 is centrally apertured as at 22 and the bottom plate 17 is centrally apertured at 23 so that the fixture may be secured in a conventional manner to a ceiling box by means of a threaded nipple and nut as in the illustrative showing of FIG. 3. These same apertures may of course be used for securing the fixture to a depending chain or rod for open mounting. The bottom plate 17 is also apertured as at 24 through which the appropriate wiring from the electrical plugs 25 for energizing the lamps passes inward into the ballast enclosure.

The lamp holding structure of the light fixture is provided by the configuration of the sidewall lower skirt section 20. The smaller of the two circular fluorescent lamps illustrated in phantom section, and which typically would be a twenty-two watt lamp, is observed to fit between the sidewall and within the confines of the sidewalls lower skirt section 20. Diametrically opposed regions of the tube spaced at 90° intervals about the tube circumference project outwardly through ovaloid openings 26 extending horizontally centrally through the sidewall lower skirts 20. The guage of the metal from which typically the fixture is fashioned is such that there is sufficient resilience to permit the sidewall skirts 20 to move outward sufficiently to permit insertion and capture within the ovaloid openings of the circular fluorescent lamp.

The opposite ends of each of the lower skirt sections 20 is arcuately formed as at 27 with one end of the arc beginning at the lower end of each corner 14 and curving inward toward the ovaloid openings 26 and then curving back outward and terminating at a cusp 28 at the sidewall lower edges 18. The depth of the arcuate cuts 27 is such that the inside diameter of the outer fluorescent lamp falls without stress thereinto, and the cusps 28 all lie on a circle of greater diameter than the inner diameter of the outer fluorescent circular lamp. Consequently, the lamp is held captive within the arcuate formations and outside of the sidewall lower skirt sections by means of the cusps 28. The resilience of the sidewall skirts permits inward flexing of the cusps 28 sufficiently to permit passage therebeyond of the outer fluorescent lamp.

Figure 4:
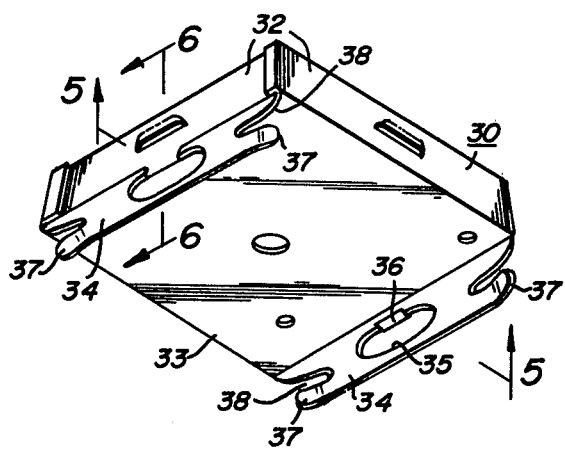
FIG. 4 is a perspective view from below of another and preferred embodiment of the invention.
Figure 5:
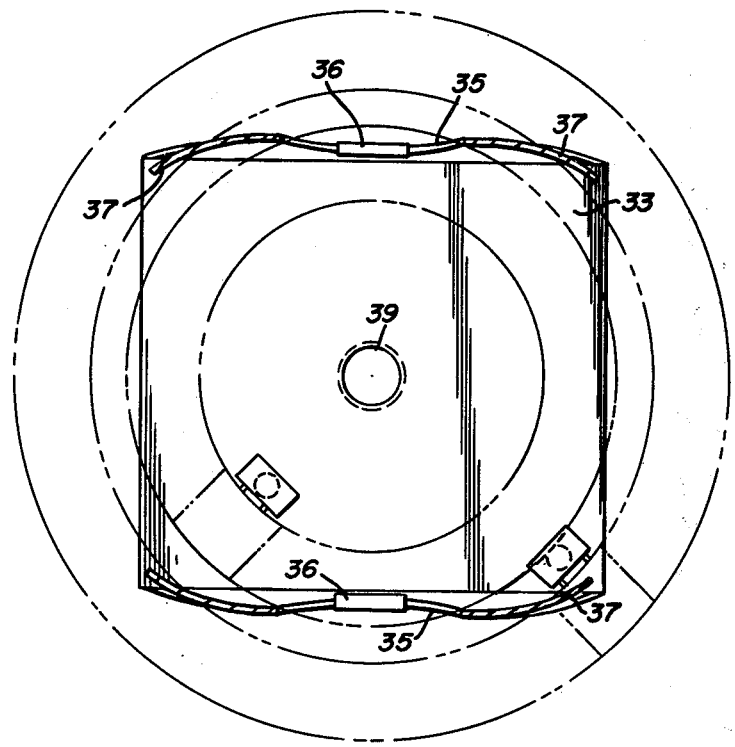
FIG. 5 is a horizontal sectional view through the fixture as shown in FIG. 4 as would be seen when viewed along the line 5—5 of FIG. 4.
Figure 6:
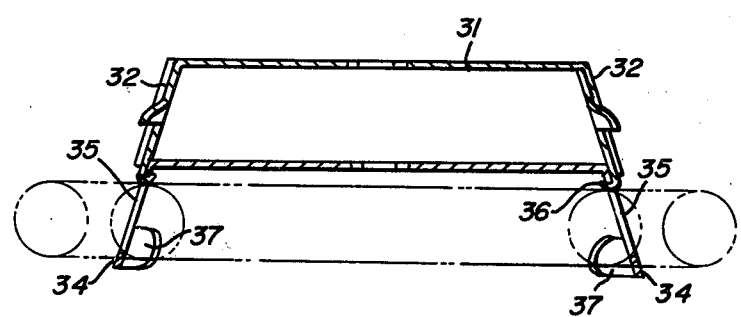
FIG. 6 is a vertical sectional view through the light fixture shown in FIG. 4 as would be seen when viewed along the line 6—6 of FIG. 4.

A modified form of the invention shown in FIGS. 1 through 3 is illustrated in FIGS. 4, 5 and 6, this modified form being the preferred embodiment. The embodiment of FIG. 4 is similar to that shown in FIG. 1 in that it includes an enclosed box designated generally as 30 formed from an inverted pan having a top 31 and four depending sidewalls 32 with the bottom of the box being closed by a bottom plate 33. The embodiment of FIG. 4 differs from that of FIG. 1 however in that the lamp retaining depending skirts 34 are formed integrally with the bottom plate 33 and are not part of the sidewalls 32. Additionally, the skirts 34 are only two in number instead of the four as shown in the embodiment of FIG. 1, but as in the embodiment of FIG. 1, the skirts are formed with longitudinally extending central ovaloid openings 35. A pair of tabs 36 which depend from a pair of the sidewalls 32 are turned inward through the tops of the ovaloid openings to secure the bottom plate 33 to the box 30. The ovaloid openings 35 function to retain the smaller diameter circular lamp in position in the same way as is effected by the ovaloid openings 26 in the sidewall lower skirts 20 of the embodiment of FIG. 1, the two skirts 34 being sufficient to securely hold the lamp.

In order to hold the larger diameter circular lamp in proper position, a pair of resilient fingers 37 are formed at the opposite ends of each of the skirts 34. The resilience of the fingers 37 causes them to assume a somewhat arcuate shape when engaged with the inner surface of the larger diameter circular lamp. As best seen in FIG. 4, the material of the skirts 34 which lies just above the resilient fingers 37 is cut back to provide an opened out notch within which the larger diameter lamp fits with its underside engaged by the resilient fingers 37.

Apertures are provided in the top wall 31 and bottom plate 33 for the purposes of mounting the fixture and to provide wiring in the same way as has already been described in connection with the embodiment of FIG. 1. Additionally, and as also provided in the embodiment of FIG. 1 although not described in connection therewith, the top wall 31 is provided with an annular knockout 39 concentrically surrounding the top wall central aperture so that the aperture may be enlarged to secure thereinto if desired a medium base lamp adaptor which permits the light fixture to be electrically connected and mounted by screwing it into a light socket, the adaptor itself not being illustrated.

Figure 7:
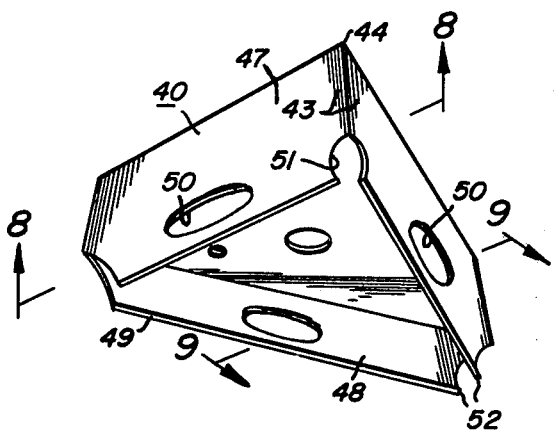
FIG. 7 is a perspective view from below of a triangular form of the light fixture according to the invention.
Figure 8:
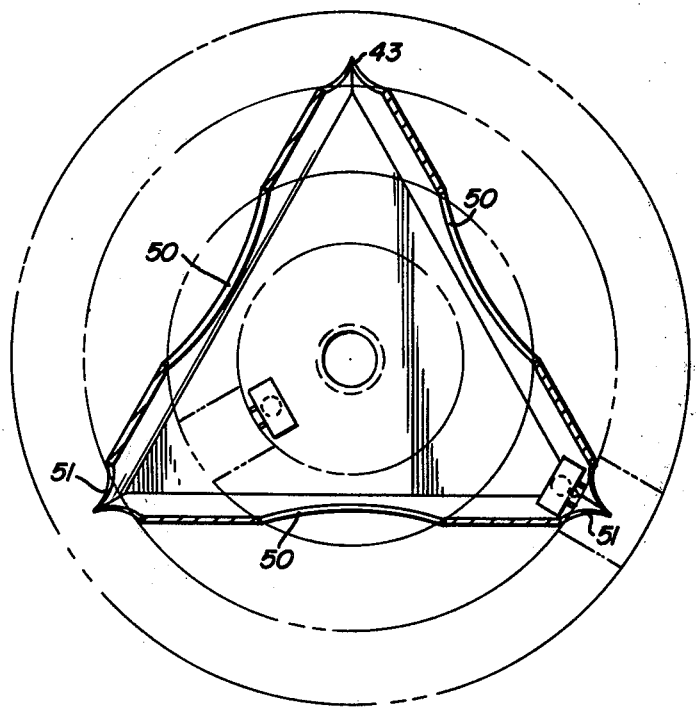
FIG. 8 is a horizontal sectional view through the fixture as shown in FIG. 7 as would be seen when viewed along the line 8—8 of FIG. 7.
Figure 9:
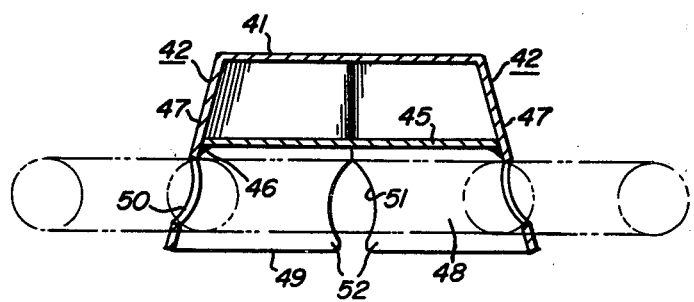
FIG. 9 is a vertical sectional view through the light fixture shown in FIG. 7 as would be seen when viewed along the line 9—9 of FIG. 7.

A third embodiment of the invention is illustrated in the showings of FIGS. 7 through 9. The concept of this embodiment differs from that of FIG. 1 only in that the fixture is of triangular form instead of square form. The triangular housing designated as 40 has a top or back pan 41 with three depending sidewalls 42 having opposite ends 43 which meet at corners 44. The wiring compartment is closed by a bottom plate 45 which is secured to the housing 40 by means of tack welds 46 best seen in the showing of FIG. 9. The sidewalls 42 have an upper section 47 and a lower skirt 48 which latter terminates at a lower edge 49.

Each of the lower skirts 48 is provided with a central ovaloid opening 50, and the opposite ends of the lower skirts 48 are provided with arcuate cuts 51 terminating in cusps 52, the arcuate cuts 51 and cusps 52 serving to securely hold the circular fluorescent lamps in position to the housing in the same manner as has already been described in connection with the embodiment of FIG. 1.

Having now described my invention in connection with particularly illustrated embodiments thereof, variations and modifications of my invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. An electrical fixture for holding circular fluorescent lamps, comprising in combination,
    (a) an enclosure within which is disposable the electrical circuitry for connecting at least one circular fluorescent lamp to a source of electrical power, and
    (b) lamp-holding resiliently deflectable skirt means depending from said enclosure, said skirt means being a one-piece integral portion of a part of said enclosure and having openings therethrough into which a portion of the outer circumferential surface of a circular fluorescent tube projects.

2. An electrical fixture for holding circular fluorescent lamps, comprising in combination,
    (a) an enclosure within which is disposable the electrical circuitry for connecting at least one circular fluorescent lamp to a source of electrical power, and
    (b) lamp-holding resiliently deflectable skirt means depending from said enclosure, said skirt means being a one-piece integral portion of a part of said enclosure, and said skirt means comprising at least two skirts each having an ovaloid opening therethrough with the major axis of said opening being parallel to the plane of a circular fluorescent lamp when the latter is held in operative position to the fixture, said skirts being so spaced apart and angularly positioned that the aforesaid fluorescent lamp is held captive therebetween with portions of the lamp surface at the outer lamp diameter projecting into the said ovaloid openings in said skirts and mechanicaly engaging at least portions of the skirts which define said ovaloid openings.

3. An electrical fixture for holding circular fluorescent lamps, comprising in combination,
    (a) an enclosure within which is disposable the electrical circuitry for connecting at least one circular fluorescent lamp to a source of electrical power, and
    (b) lamp-holding resiliently deflectable skirt means depending from said enclosure, said skirt means being a one-piece integral portion of a part of said enclosure, and said skirt means comprising at least two skirts each having laterally spaced apart end formation which engage the lamp surface on opposite sides of the inside diameter of a circular fluorescent lamp to hold the latter in operative position to the fixture.

4. An electrical fixture as set forth in claim 3 wherein said end formations each comprising an arcuate cut having portions of the arcuate surface overlying points on the surface of said lamp which are disposed on opposite sides of the central plane of the lamp and closer to the inside diameter than to the outside diameter of the lamp.

5. An electrical fixture as set forth in claim 3 wherein said end formations comprising resilient fingers deflectable radially inward with respect to said lamp and adapted to engage the inside surface of said lamp below the central plane of the lamp ring at points on the lamp surface radially outward of the inside diameter of the lamp to thereby support the latter.

6. An electrical fixture for holding circular fluorescent lamps, comprising in combination,
    (a) an enclosure within which is disposable the electrical circuitry for connecting at least one circular fluorescent lamp to a source of electrical power, and
    (b) lamp-holding resiliently deflectable skirt means depending from said enclosure, said skirt means being a one-piece integral portion of a part of said enclosure, and said skirt means comprising at least two skirts each having
        (1) an ovaloid opening therethrough with the major axis of said opening being parallel to the plane of a first circular fluorescent lamp when the latter is held in operative position to the fixture, said skirts being so spaced apart and angularly positioned that said first lamp is held captive therebetween with portions of said first lamp surface at the lamp outer diameter projecting into the said ovaloid openings in said skirts and mechanically engaging at least portions of the skirts which define said ovaloid openings, and
        (2) laterally spaced apart end formations which engage the inside surface of a second circular fluorescent lamp below the central plane of the lamp ring at points on the lamp surface radially outward of the inside diameter of said second lamp.

7. An electrical fixture for holding circular fluorescent lamps, comprising in combination
    (a) an enclosure within which is disposable the electrical circuitry for connecting at least one circular fluorescent lamp to a source of electrical power, and
    (b) lamp-holding resiliently deflectable skirt means depending from said enclosure, said skirt means being a one-piece integral portion of a part of said enclosure, and said lamp-holding skirt means is substantially planar in form.

8. An electrical fixture as set forth in claim 7 wherein said lamp-holding skirt means are plural, and diverge from one another as said skirt means recede from said enclosure.

9. An electrical fixture as set forth in claim 1 wherein said enclosure is enclosed on top, bottom and sides, and is formed only from two pieces of material, said lamp-holding skirt means being formed from a portion of one of said pieces of material.

10. An electrical fixture as set forth in claim 6 wherein said end formations each comprises an arcuate cut having portions of the arcuate surface overlying points on the surface of said lamp which are disposed on opposite sides of the central plane of the lamp and closer to the inside diameter than to the outside diameter of the lamp.

11. An electrical fixture as set forth in claim 6 wherein said end formations comprise resilient fingers deflectable radially inward with respect to said lamp and adapted to engage the inside surface of said lamp below the central plane of the lamp ring at points on the lamp surface radially outward of the inside diameter of the lamp to thereby support the latter.

12. An electrical fixture as set forth in claim 2 wherein said lamp-holding skirt means are substantially planar in form, are plural, and diverge from one another as said skirt means recedes from said enclosure.

13. An electrical fixture as set forth in claim 2 wherein said enclosure is enclosed to top, bottom and sides, and is formed only from two pieces of material, said lamp-holding skirt means being formed from a portion of one of said pieces of material.

14. An electrical fixture as set forth in claim 6 wherein said lamp-holding skirt means are substantially planar in form, are plural, and diverge from one another as said skirt means recedes from said enclosure.

15. An electrical fixture as set forth in claim 6 wherein said enclosure is enclosed on top, bottom and sides, and is formed only from two pieces of material, said lamp-holding skirt means being formed from a portion of one of said pieces of material.

* * * * *